United States Patent
Allgaier et al.

(10) Patent No.: US 8,062,173 B2
(45) Date of Patent: Nov. 22, 2011

(54) METHOD FOR CONTROLLING A HYBRID DRIVETRAIN

(75) Inventors: Bernd Allgaier, Kressbronn (DE); Friedrich Tenbrock, Langenargen (DE); Thomas Lemp, Langenargen (DE); Michael Gromus, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 420 days.

(21) Appl. No.: 12/477,191

(22) Filed: Jun. 3, 2009

(65) Prior Publication Data

US 2009/0312143 A1    Dec. 17, 2009

(30) Foreign Application Priority Data

Jun. 12, 2008   (DE) .................. 10 2008 002 382.5 U

(51) Int. Cl.
    *B60W 10/02*   (2006.01)
(52) U.S. Cl. ................................. 477/5; 477/6
(58) Field of Classification Search .................. 477/2, 5, 477/6, 14, 15; 180/65.21, 65.265, 65.25, 180/65.26, 65.27, 65.28, 65.285; 903/903, 903/913, 914, 918

See application file for complete search history.

(56) References Cited

U.S. PATENT DOCUMENTS

| | | | | |
|---|---|---|---|---|
| 5,713,814 A | * | 2/1998 | Hara et al. | 477/5 |
| 5,735,770 A | * | 4/1998 | Omote et al. | 477/5 |
| 5,846,155 A | * | 12/1998 | Taniguchi et al. | 477/2 |
| 5,903,061 A | * | 5/1999 | Tsuzuki et al. | 477/3 |
| 5,944,630 A | * | 8/1999 | Omote | 477/5 |
| 6,009,371 A | * | 12/1999 | Kobayashi | 903/903 |
| 6,262,491 B1 | * | 7/2001 | Kitajima et al. | 180/65.26 |
| 6,306,057 B1 | * | 10/2001 | Morisawa et al. | 475/5 |
| 6,746,366 B2 | | 6/2004 | Tamor | |
| 7,244,208 B2 | | 7/2007 | Bauknecht et al. | |
| 2007/0287564 A1 | * | 12/2007 | Cho et al. | 475/5 |
| 2008/0039261 A1 | * | 2/2008 | Cho et al. | 475/5 |
| 2010/0019709 A1 | * | 1/2010 | Le Neindre et al. | 180/65.285 |

FOREIGN PATENT DOCUMENTS

| | | |
|---|---|---|
| DE | 43 24 010 A1 | 1/1995 |
| DE | 100 12 221 A1 | 10/2001 |
| DE | 101 50 990 A1 | 5/2002 |
| DE | 102 60 435 A1 | 7/2004 |
| DE | 103 46 640 A1 | 5/2005 |
| DE | 10 2005 007 966 A1 | 10/2006 |

* cited by examiner

*Primary Examiner* — Hau Phan
(74) *Attorney, Agent, or Firm* — Davis & Bujold, P.L.L.C.

(57) ABSTRACT

A method for controlling a hybrid drivetrain of a motor vehicle such that, during a thrust operation of the vehicle, a change takes place from a combustion-powered driving mode, in which the combustion engine is in a thrust operation, the separator clutch is engaged and the electric machine contributes no force, or from a combined driving mode in which the engine is in a thrust operation, the clutch is engaged and the electric machine operates as a generator, to an electric driving mode in which the engine is switched off, the clutch is disengaged and the electric machine operates as a generator. To efficiently change driving modes, the clutch is partially disengaged to a slip limit; the clutch is then completely disengaged; and when the clutch reaches the slip limit, the generator torque of the electric machine is increased inversely to the torque that can be transmitted by the clutch.

10 Claims, 2 Drawing Sheets

METHOD FOR CONTROLLING A HYBRID DRIVETRAIN

This application claims priority from German patent application serial no. 10 2008 002 382.5 filed Jun. 12, 2008.

FIELD OF THE INVENTION

The invention concerns a method for controlling a hybrid drivetrain of a motor vehicle in which a combustion engine, a separator clutch, an electric machine that can be operated as a motor and as a generator, and a drive transmission, which is in driving connection on its output side with a drive axle of the motor vehicle, are arranged in series, such that when the motor vehicle is in thrust operation a change takes place from a combustion-engine-powered driving mode with the combustion engine in thrust operation, the separator clutch engaged and the electric machine switched to contribute no force, or from a combination drive mode with the combustion engine in thrust operation, the separator clutch engaged and the electric machine operating as a generator, to an electric drive mode with the combustion engine switched off, the separator clutch disengaged and the electric machine operating as a generator.

BACKGROUND OF THE INVENTION

A hybrid drivetrain that acts in parallel with a serial arrangement of the components in the manner described above is possible in various embodiments.

For example, from DE 103 46 640 A1 a hybrid drivetrain of the above type is known, in which the electric machine is arranged coaxially with the input shaft of the drive transmission, the rotor of the electric machine is directly connected with the input shaft of the drive transmission in a rotationally fixed manner, and the drive transmission is made as an automatic planetary transmission.

DE 100 12 221 A1 describes a hybrid drive device with a main drivetrain and an auxiliary drivetrain. In the main drivetrain, which in the present case corresponds to the hybrid drivetrain, the electric machine concerned is arranged axis-parallel to the input shaft of the drive transmission and the rotor of the electric machine is in driving connection with the input shaft of the drive transmission via an input transmission stage EK, which is made as a spur gear pair with a high transmission ratio ($i_{EK}$>1). The drive transmission is preferably an automatic planetary transmission. In such an arrangement of the electric machine the data presented below concerning the torque and the speed of the electric machine refer analogously to the reduced values at the output element of the input transmission stage or to the input shaft of the drive transmission.

In the present invention the drive transmission is preferably an automated change-under-load transmission such as an automatic planetary transmission, a dual-clutch transmission or a continuously variable transmission. However, the drive transmission can also be an automated change-speed transmission of countershaft design, in which shift processes are associated with a traction force interruption.

Furthermore, a starting element can be positioned immediately upstream from the drive transmission. Thus, in a manner known per se a hydraulic torque converter can be positioned upstream from an automatic transmission, which during normal driving operation, i.e. other than when starting off or maneuvering, is bridged by an engaged bridging clutch. Upstream from a continuously variable transmission and an automated change-speed transmission can, in each case, be positioned a starting clutch or a starting and shifting clutch made as a dry clutch or as a wet clutch, in particular a disk clutch, which is engaged during normal driving operation. The same applies to a dual clutch transmission, which—as is known—comprises two input shafts each respectively associated with a starting and shifting clutch. Alternatively, a starting element can also be integrated in the drive transmission, for example if a starting clutch associated with the input shaft is accommodated inside the transmission housing of the drive transmission, or if a frictional shift element of a drive transmission, made as an automatic transmission, which transmits load during starting, is used as the starting clutch.

A hybrid drivetrain of such type offers the possibility of operating a motor vehicle, as necessary, in a purely combustion-engine-powered driving mode, in a purely electric driving mode or in a combined driving mode. In the combustion-powered mode the separator clutch is engaged, the electric machine is switched to contribute no force and during traction operation the motor vehicle is driven solely by the drive torque produced by the combustion engine, and in thrust operation it is braked by the drag torque of the combustion engine then running in thrust operation, if necessary with further braking devices such as a service brake or a retarder in addition to the braking torque itself.

In the electric mode the separator clutch is disengaged, the combustion engine is switched off and, in traction operation, the motor vehicle is driven solely by the drive torque of the electric machine then being operated as a motor, whereas during thrust operation the vehicle is braked by the drag torque of the electric machine then operating as a generator, if necessary with further braking devices in addition to the braking torque.

In the combined driving mode the separator clutch is engaged. During traction operation the motor vehicle is driven by the sum of the drive torques of the combustion engine and the electric machine, whereas in thrust operation it is braked by the sum of the drag torques of the combustion engine and the electric machine then operating as a generator, if necessary with further braking devices in addition to the braking torque.

Apart from the hybrid driving modes considered above, the combustion engine and the electric machine can if necessary also be operated with different force flow directions, whereby the torques produced partially cancel out. Thus, in certain traction operation phases it can be appropriate to operate the electric machine as a generator in opposition to the action of the drive torque from the combustion engine, for example in order to charge an empty electric energy accumulator, or in order to operate the combustion engine at an optimum operating point. Likewise, in certain thrust operation phases it can be appropriate to operate the electric machine as a motor in opposition to the drag torque of the combustion engine, for example to keep the combustion engine above a critical rotational speed limit.

Owing to the variety and different operating properties of the possible embodiments of such a hybrid drivetrain, known control methods mostly assume at least a certain power of the electric machine and/or a certain structure of the drive transmission. Furthermore, the known control methods are often limited to the solution of partial problems that occur during the control of the specific hybrid drivetrain concerned.

DE 43 24 010 C2 discloses a method for controlling a corresponding hybrid drivetrain which starts with a structure of the drive transmission in the form of an automatic planetary transmission with a hydraulic torque converter immediately upstream from it. In this known method, during pure electric driving operation the electric machine is controlled in such a manner that the torque characteristic of a combustion engine is simulated. Furthermore, the known method provides that when the motor vehicle concerned is operated in thrust mode, the braking torque (drag torque) of the combustion engine is supplemented or replaced by a braking torque produced by operating the electric machine as a generator.

A similar method for controlling a corresponding hybrid drivetrain is described in DE 101 50 990 A1. This known method also starts with a structure of the drive transmission in the form of an automatic planetary transmission, but this time with no hydraulic torque converter upstream from it. In this method too, during pure electric driving operation the electric machine is controlled in such manner that the operating behavior of the combustion engine is imitated. When electric-powered driving (with the combustion engine inactive and the separator clutch disengaged) is changed to combined driving operation or to combustion-engine-powered driving operation, the combustion engine is started by engaging the separator clutch, this being intended to ensure a soft transition, i.e. one with very little jerkiness, to the power of the combustion engine. However, specifically how the separator clutch and the electric machine should be controlled in order to achieve this outcome is not explained in DE 101 50 990 A1.

Another method for controlling a corresponding hybrid drivetrain is known from DE 10 2005 007 966 A1, which starts with a structure of the drive transmission as a change-speed transmission, i.e. an automated change-speed transmission with gearshift-related traction force interruption. In this known method the electric machine, clearly one with relatively low power, is used primarily as a starter motor for the combustion engine, and an electric generator with an auxiliary drive for synchronizing the respective target gear of the drive transmission during gearshift operations. In addition the electric machine is intended for use in other auxiliary functions such as preventing or minimizing rolling downhill, performing a crawling function and for active damping of rotation oscillations. In contrast, no provision is made for using the electric machine as a main drive motor so DE 10 2005 007 966 A1 does not relate to any purpose beyond the auxiliary functions mentioned.

During the operation of a hybrid drivetrain of the structural form considered here, the general problem arises, when changing from the combustion-engine-powered mode or the combined mode to the electric mode, of how to effect the change in the smoothest possible way, i.e. with little or no jerkiness, and thus in a manner that is comfortable for the occupants of the vehicle and which reduces the wear of the hybrid drivetrain's components.

As may be generally appreciated, a smooth change from the combustion-powered driving mode in which the combustion engine is operating in traction, the separator clutch is engaged and the electric machine contributes no force, or from the combined driving mode in which the combustion engine is operating in traction, the separator clutch is engaged and the electric machine is operating as a motor, to the electric driving mode in which the combustion engine is switched off, the separator clutch is disengaged and the electric machine is operating as a motor, is achieved by first reducing the torque of the combustion engine down to zero by means of the engine control system and at the same time correspondingly increasing the torque of the electric machine in its motor operation.

When the torque of the combustion engine has been reduced to zero, the separator clutch is disengaged and the combustion engine is then switched off.

Since the torque of the electric machine is increased to the same extent as the torque of the combustion engine is reduced, and the separator clutch is only disengaged once the torque of the combustion engine has become zero, a change carried out in this way from the combustion-powered or the combined driving mode to the electric-powered mode takes place substantially free from jerkiness and essentially without any change of the resulting drive torque on the input shaft of the drive transmission.

Analogously to this, during thrust operation of the motor vehicle a smooth change from the combustion-powered mode in which the combustion engine is operating in thrust, the separator clutch is engaged and the electric machine contributes no force, and from the combined driving mode in which the combustion engine is operating in thrust, the separator clutch is engaged and the electric machine is operating as a generator, to the electric driving mode in which the combustion engine is switched off, the separator clutch is disengaged and the electric machine is operating as a generator, is achieved by first reducing the drag torque of the combustion engine to zero and at the same time reducing the torque of the electric machine correspondingly, i.e. increasing the drag torque produced by the electric machine when it is operating as a generator to the same extent. When the drag torque of the combustion engine has been reduced to zero, the separator clutch is disengaged and the combustion engine is then switched off.

However, the disadvantage of this last-mentioned procedure during thrust operation of the motor vehicle is that the combustion engine, running in thrust operation and switched appropriately for thrust, has to be ignited in order to reduce its drag torque. This means that the supply of fuel and if needs be the ignition must be switched on in order to bring about the reduction of the drag torque and to be able to control the timing of the drag torque reduction by means of the engine control system in the desired manner. This on the one hand entails relatively large and time-consuming control complexity, and also results in unnecessary fuel consumption and corresponding exhaust gas and noise emissions.

SUMMARY OF THE INVENTION

Accordingly, the purpose of the present invention is to propose a method for controlling a hybrid drivetrain of the type described to begin with, by means of which, when the motor vehicle is in thrust operation, a change from the combustion-powered or the combined driving mode to the electric driving mode can be carried out more simply and more rapidly.

To achieve this objective the invention starts from a method for controlling a hybrid drivetrain of a motor vehicle, made with a series arrangement of a combustion engine, a separator clutch, an electric machine that can operate as a motor and a generator, and a drive transmission in driving connection on its output side with a drive axle of the motor vehicle, such that when the motor vehicle is in thrust operation a change takes place from a combustion-powered driving mode with the combustion engine in thrust operation, the separator clutch engaged and the electric machine contributing no force, or from a combined driving mode with the combustion engine in thrust operation, the separator clutch engaged and the electric machine operating as a generator, to an electric driving mode in which the combustion engine is switched off, the separator clutch is disengaged and the electric machine is operating as a generator.

Furthermore, the method according to the invention provides that the change to the electric driving mode during thrust operation of the motor vehicle is carried out with the following steps:

a) the separator clutch K is disengaged as far as its slip limit ($M_{K\_max} \leqq M_K \leqq M_{VM}(t1)$, $M_K(t1)=M_{VM}(t1)$), b) the separator clutch K is disengaged further until it is completely disengaged ($M_{VM}(t1) \leqq M_K \leqq 0$, $M_K(t2)=0$), and c) from when the slip limit of the separator clutch K is reached, the generator torque $M_{EM}$ of the electric machine EM is increased to the same extent as the torque $M_K$ that can be transmitted by the separator clutch K is reduced ($dM_{EM}/dt=-dM_K/dt$, $\Delta M_{EM}=-\Delta M_K$).

Accordingly, the method according to the invention relates to a method for controlling a hybrid drivetrain of a motor vehicle, made with a series arrangement of a combustion engine, a separator clutch, an electric machine that can operate as a motor and a generator, and a drive transmission in driving connection on its output side with a drive axle of the motor vehicle. During thrust operation of the motor vehicle a change from a combined driving mode to an electric mode should in general take place as smoothly and therefore comfortably as possible in a manner that least stresses the materials involved. The combined driving mode is the mode in which the combustion engine is in thrust operation, the separator clutch is engaged and the electric machine is operating as a generator. In the electric mode the combustion engine is switched off, the separator clutch is disengaged and the electric machine is operating as a generator.

To be able, during thrust operation of the motor vehicle, to carry out the change from a combustion-powered mode or a combined mode to the electric mode more simply and more rapidly, the invention provides that the separator clutch is first disengaged to its slip limit, and the separator clutch previously engaged with excess contact pressure is disengaged to an extent such that the torque $M_K(t1)$ that can be transmitted by the separator clutch corresponds to the current drag torque $M_{VM}(t1)$ of the combustion engine ($M_K(t1)=M_{VM}(t1)$).

Then, the separator clutch is disengaged farther until it reaches the fully disengaged condition ($M_K(t2)=0$), so that the drag torque $M_{VM}$ of the combustion engine, which during this phase is determined by the torque $M_K$ of the separator clutch that can be transmitted ($M_{VM}=M_K$), is reduced to zero. During this, in order to avoid any interruption of the resulting drag torque ($M_{VM}+M_{EM}$) that acts on the input shaft of the drive transmission, at the same time the drag torque $M_{EM}$ produced by the electric machine when it is operating as a generator is increased to the same extent that the separator clutch torque $M_K$ that can be transmitted, and hence the effective drag torque $M_{VM}$ of the combustion engine, is reduced ($dM_{EM}/dt=-dM_K/dt$, $\Delta M_{EM}=-\Delta M_K$).

This means that the drag torque in the combustion-powered driving mode, initially equal to zero ($M_{EM}(t1)=0$), or the drag torque in the combined driving mode, already existing due to the operation of the electric machine EM as a generator ($M_{EM}(t1)<0$), is correspondingly increased. Since, in contrast to the control of the separator clutch torque $M_K$ that can be transmitted, the torque $M_{EM}$ of the electric machine can be controlled simply and rapidly, in the present control method the transmissible separator clutch torque $M_K$ constitutes the guiding magnitude to which the torque $M_{EM}$ produced by the electric machine is inversely related.

Compared with the known procedure for changing from the combustion-powered or the combined driving mode to the electric driving mode during thrust operation of the motor vehicle, the process sequence according to the invention can be carried out more simply and rapidly in terms of control technique. This is essentially because to reduce the drag torque $M_{VM}$ of the combustion engine, in the method according to the invention it is not ignited, so that besides unnecessary fuel consumption and the corresponding exhaust and noise emissions, the torque peaks that necessarily occur when the combustion engine is ignited are also avoided.

To achieve reproducible control sequences it is expedient to disengage the separator clutch in accordance with a specified torque variation path $M_K(t)$, in which the torque variations $M_K(t)$ during the first phase (t0 to t1) until the slip limit is reached (t1: $M_K(t1)=M_{VM}(t1)$) and the subsequent, second phase (t1 to t2) until the separator clutch has been fully disengaged (t2: $M_K(t2)=0$) do not necessarily have to be identical or similar.

In each case the specified separator clutch torque variation $M_K(t)$ is preferably defined as a ramp-shaped torque decrease with a constant torque gradient $dM_K/dt=C$, which enables relatively simple control of the clutch control element involved by virtue of an associated clutch characteristic, and of the electric machine controlled as a function thereof.

Since the disengagement of the separator clutch until the slip limit is reached (t1: $M_K(t1)=M_{VM}(t1)$) takes place with no change of the torque transmission and without following any other control magnitude, to speed up the process sequence it is advantageous for the separator clutch to be disengaged more rapidly in the phase until the slip limit has been reached (t1) than in the subsequent, second phase until complete disengagement (t2).

Since, despite the smooth and therefore largely jerk-free transition between the combined and the electric driving modes, torque peaks that reduce comfort and stress the components of the hybrid drivetrain can still occur during the process sequence due to possible control imprecision which can arise because of the wear condition and the current operating temperature of the combustion engine and the separator clutch, it is expedient to adopt measures for damping such torque peaks.

Accordingly, if a starting clutch made as a friction clutch positioned immediately upstream from or integrated in the drive transmission is present, then in order to damp torque peaks, during the change of the hybrid driving mode the said starting clutch is kept disengaged to its slip limit. This means that at the beginning of the process sequence the starting clutch is disengaged as far as its slip limit, kept at the slip limit during the process, and completely engage again at the end of the process. Torque peaks that occur are damped thereby, in that the starting clutch concerned briefly adopts the function of a safety, torque-overload protection clutch during its slipping operation, so that positive torque peaks are smoothed or filtered out.

If the drive transmission is designed as a dual-clutch transmission provided with two shifting clutches, the same function can be achieved by keeping the load-transmitting shifting clutch disengaged at its slip limit during the change of hybrid driving mode in order to damp torque peaks.

If the drive transmission is made as an automatic planetary transmission provided with frictional shift elements, torque peaks can be damped by keeping at least one of the load-transmitting frictional shift elements disengaged to its slip limit during the change of hybrid driving mode.

If a hydraulic torque converter provided with a bridging clutch is positioned immediately upstream from the drive transmission, then in contrast, torque peaks can be damped by keeping the bridging clutch fully disengaged during the hybrid driving mode change. This means that at the beginning of the process the bridging clutch is disengaged completely, kept disengaged during the process, and completely engaged again at the end of the process. In this case any torque peaks that occur are damped by virtue of the damping-elastic transmission properties of the torque converter.

If a gearshift operation is to be carried out just at a time very close to the change of hybrid driving mode, then it is expedient to carry out the gearshift to coincide with the hybrid driving mode change since in this way torque peaks related to the gearshift and torque peaks related to the hybrid driving mode change can partially offset one another or at least be perceived by the vehicle's occupants as a single, comfort-reducing load jerk.

If the drive transmission is made as a change-speed transmission in which traction force interruptions are caused by gearshifts, even then the possibility exists of making use of the gearshift-related thrust force interruption in the context of the hybrid driving mode change to accelerate disengaging of the separator clutch and correspondingly to speed up the increase of the thrust torque $M_{EM}$ of the electric machine operating as a generator.

BRIEF DESCRIPTION OF THE DRAWINGS

To clarify the invention, the description of drawings with example embodiments is attached. The drawings show.

DETAILED DESCRIPTION OF THE PREFERRED EMBODIMENTS

Figure 1:
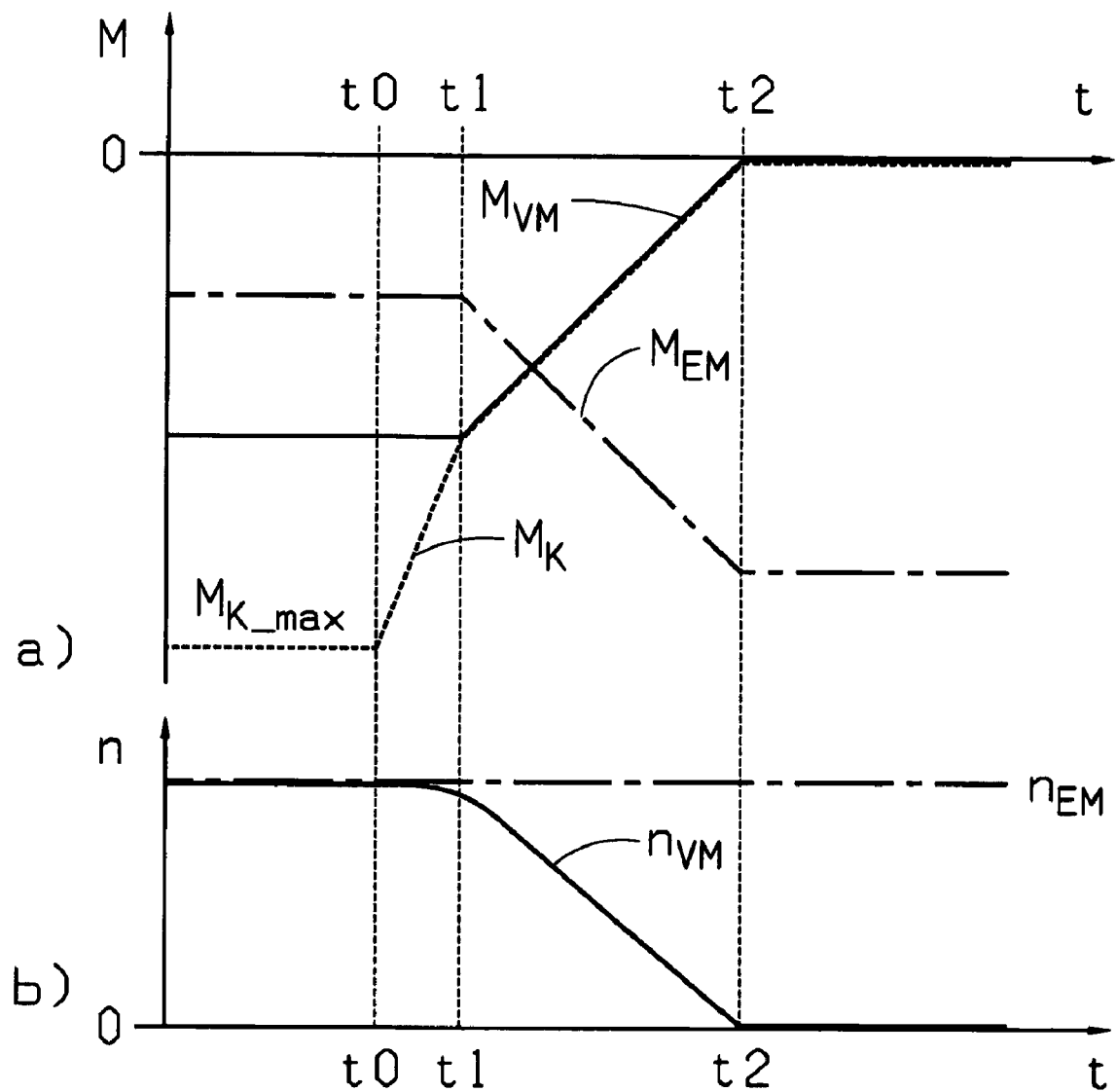
FIG. 1: A sequence according to the invention for changing from the combined to the electric driving mode of a hybrid drivetrain while the motor vehicle is in thrust operation, in the form of relevant torque and speed variations.
Figure 2:
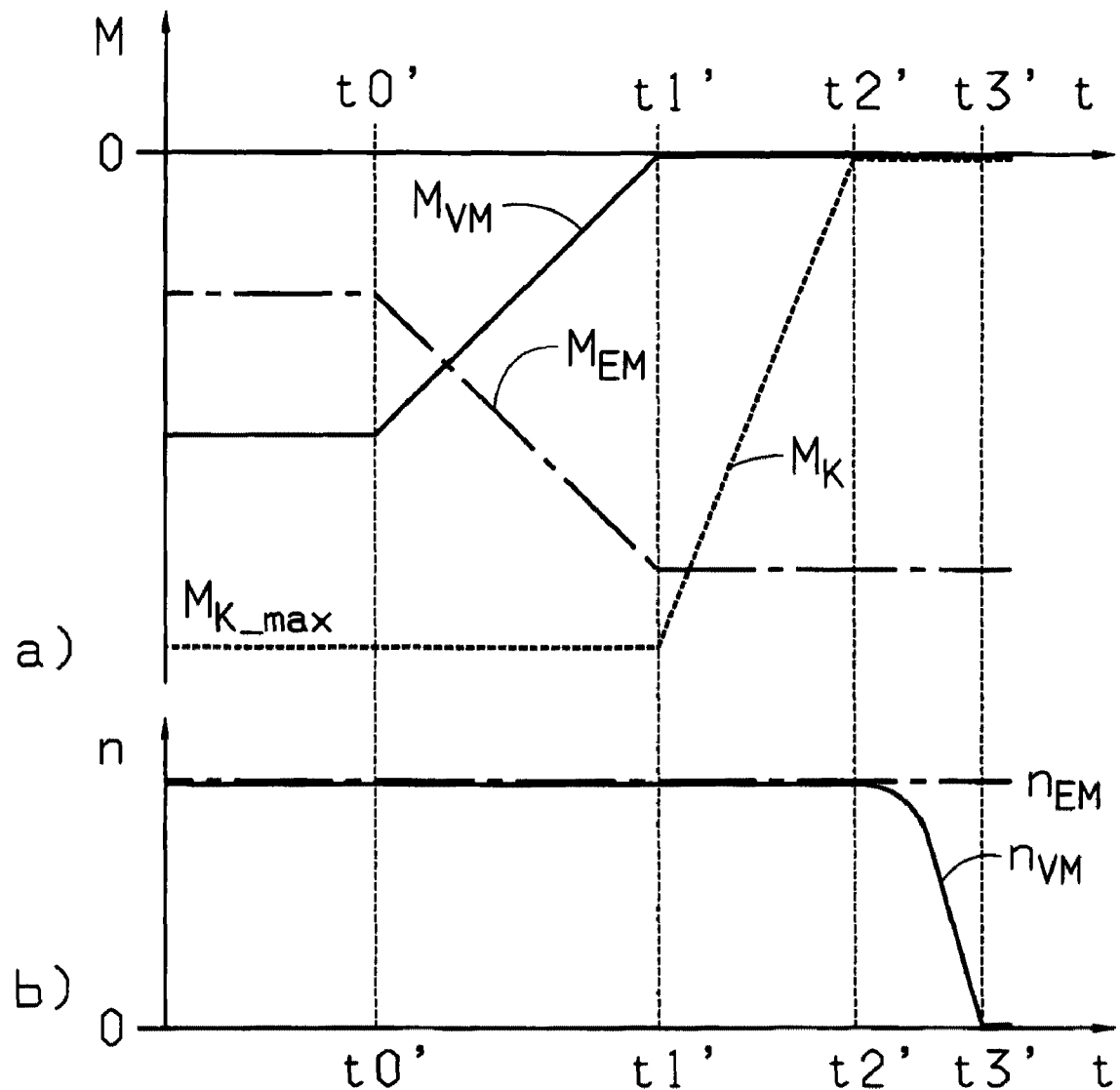
FIG. 2: A known sequence for changing from the combined to the electric driving mode of a hybrid drivetrain while the motor vehicle is in thrust operation, in the form of relevant torque and speed variations.

The two diagrams of FIGS. 1 and 2 illustrate, with reference to relevant torque and speed variations, two different processes related to a hybrid drivetrain of a motor vehicle made as a parallel hybrid with an arrangement in series of a combustion engine VM, a separator clutch K, an electric machine EM that can operate as a motor and as a generator, and a drive transmission in driving connection on its output side with a drive axle of the motor vehicle.

With reference to the torque variations, shown in each case in part a) of the two figures, namely those of the combustion engine $M_{VM}(t)$, the electric machine $M_{EM}(t)$ and the torque $M_K(t)$ that can be transmitted by the separator clutch K, and to the respective speed variations shown in part b) of the figures, namely those of the combustion engine $n_{VM}(t)$ and the electric machine $n_{EM}(t)$, it is in each case shown how, during thrust operation of the motor vehicle, the change takes place from a combined driving mode in which the combustion engine VM is in thrust operation, the separator clutch K is engaged and the electric machine EM is operating as a generator, to an electric driving mode in which the combustion engine VM is switched off, the separator clutch K is disengaged and the electric machine EM is operating as a generator with a higher torque.

In the widely known process sequence shown in FIG. 2, from time t0' onward the thrust torque $M_{VM}$<0 of the combustion engine is reduced continuously and, by corresponding control, the generator torque $M_{EM}$<0 of the electric machine is increased to the same extent ($M_{VM}(t0')+M_{EM}(t0')=M_{VM}(t1')+M_{EM}(t1')$). However, to reduce the thrust torque $M_{VM}$<0 of the combustion engine, the engine must be ignited, which is difficult and complicated to do in terms of control technique and which also gives rise to unnecessary fuel consumption and the corresponding exhaust and noise emissions. After the complete disappearance of the drag torque $M_{VM}$ of the combustion engine VM at time t1'($M_{VM}(t1')=0$), the separator clutch K previously engaged with excess contact pressure ($M_K(t1')=M_{K\text{-}max}$) is completely disengaged ($M_K(t2')=0$) and then the combustion engine VM is switched off ($n_{VM}(t3')=0$). Thus, this process sequence occupies the relatively long time span from t0' to t3'.

In contrast, the process sequence according to the invention shown in FIG. 1 provides that the separator clutch K engaged with excess contact pressure ($M_K(t0)=M_{K\_max}$) is first disengaged to its slip limit ($M_K(t1)=M_{VM}(t1)$), preferably in accordance with a predetermined linear torque decrease $M_K(t)$ having a constant, higher torque gradient $dM_K/dt$. Then, the separator clutch K, is disengaged further, preferably in accordance with a predetermined torque decrease $M_K(t)$ having a constant, lower torque gradient $dM_K/dt$ until it is fully disengaged, whereby the drive power of the combustion engine VM, and hence the effective drag torque $M_{VM}$<0 of the combustion engine is reduced by the output-side drivetrain via the separator clutch K.

Due to the further disengagement of the separator clutch K, the combustion engine VM is braked by its inherent drag torque and comes to rest ($N_{VM}(t2)=0$) approximately when the separator clutch K is disengaged completely, at time t2 ($M_K(t2)=0$).

In time correspondence with the decrease of the effective drag torque $M_{VM}$<0 of the combustion engine VM, which is determined between times t1 and t2 by the torque $M_K$ that can be transmitted by the separator clutch ($M_{VM}(t)=M_K(t)$), the generator torque $M_{EM}$<0 of the electric machine EM is increased by appropriate control to the same extent that the transmissible torque $M_K$ of the separator clutch K is reduced. Thus, K is the guiding magnitude for the control of the torque $M_{EM}(t)$ of the electric machine EM and the torque $M_{EM}(t)$ of the electric machine EM follows the transmissible torque $M_K(t)$ of the separator clutch K inversely. This avoids an interruption of the resulting thrust torque ($M_{VM}+M_{EM}$) on the input shaft of the drive transmission and achieves a substantially jerk-free transition from the combined to the electric driving mode. Compared with the known process sequence shown in FIG. 2, the process sequence according to the invention shown in FIG. 1 is recognizably shorter and simpler to control, since the combustion engine does not have to be ignited.

INDEXES

C Constant
EK Input transmission stage
EM Electric machine
$i_{EK}$ Transmission ratio of the input transmission stage
K Separator clutch
$M_{EM}$ Torque of the electric machine
$M_K$ Transmissible torque of the separator clutch, clutch torque
$M_{K\_max}$ Maximum clutch torque
$M_{VM}$ Torque of the combustion engine, engine torque
$n_{EM}$ Speed of the electric machine
$n_{VM}$ Speed of the combustion engine
t0-t2 Time points
t0'-t3' Time points
VM Combustion engine
$\Delta M_{EM}$ Change of the torque of the electric machine
$\Delta M_K$ Change of the transmissible torque of the separator clutch

The invention claimed is:
1. A method of controlling a hybrid drivetrain of a motor vehicle, in which the motor vehicle has, arranged in series, a combustion engine (VM), a separator clutch (K), an electric machine (EM) that is operable as a motor and a generator, and a drive transmission which is drivingly connected, on an output side thereof, with a drive axle of the motor vehicle such that, during a thrust operation of the motor vehicle, a change takes place either from a combustion-powered driving mode in which the combustion engine (VM) is in a thrust operation, the separator clutch (K) is engaged and the electric machine (EM) does not contribute any driving no force, or from a combined driving mode in which the combustion engine (VM) is in the thrust operation, the separator clutch (K) is engaged and the electric machine (EM) operates as a generator, to an electric driving mode in which the combustion engine (VM) is turned off, the separator clutch (K) is disengaged and the electric machine (EM) operates as a generator, the change to the electric driving mode, during the thrust operation of the motor vehicle, is carried out by the method comprising the steps of:

commencing disengagement of the separator clutch (K) up to a slip limit;

disengaging the separator clutch (K) from the slip limit until the separator clutch (K) is completely disengaged; and from the slip limit until the separator clutch (K) is completely disengaged, increasing generator torque ($M_{EM}$) by a same amount as the reduction of torque ($M_K$) that is transmitted by the separator clutch (K) when the separator clutch (K) is being disengaged.

2. The method according to claim 1, further comprising the step of disengaging the separator clutch (K) is in accordance with a predetermined torque variation ($M_K(t)$).

3. The method according to claim 2, further comprising the step of defining the predetermined torque variation ($M_K(t)$) of the separator clutch (K) as a ramp-shaped torque decrease with a constant torque gradient ($dM_K/dt = C$).

4. The method according to claim 1, further comprising the step of disengaging the separator clutch (K), during a first phase (t0 to t1), until the separator clutch (K) reaches the slip limit (t1), more rapidly than disengaging the separator clutch (K) in a subsequent, second phase (t1 to t2) until the separator clutch (K) is fully disengaged (t2).

5. The method according to claim 1, wherein the motor vehicle has a starting friction clutch which is positioned either immediately upstream from or integrated in the drive transmission and the method further comprising the step of maintaining disengagement of the starting friction clutch as far as a slip limit during the change of the hybrid driving mode to damp torque peaks.

6. The method according to claim 1, wherein the drive transmission is a dual-clutch transmission with two shifting clutches and the method further comprising the step of maintaining disengagement of one of the load-transmitting shifting clutches as far as a slip limit during the change of the hybrid driving mode to damp torque peaks.

7. The method according to claim 1, wherein the drive transmission is an automatic planetary transmission provided with frictional shift elements and the method further comprising the step of maintaining disengagement of at least one load-transmitting frictional shift element as far as a slip limit during the change of the hybrid driving mode to damp torque peaks.

8. The method according to claim 1, wherein a hydraulic torque converter is provided with a bridging clutch which are positioned immediately upstream from the drive transmission and the method further comprising the step of maintaining disengagement of the bridging clutch during the change of the hybrid driving mode to damp torque peaks.

9. The method according to claim 1, further comprising the step of carrying out a gearshift operation at a time close to that of the hybrid driving mode change in co-ordination with the hybrid driving mode change.

10. The method according to claim 9, wherein the drive transmission is a change-speed transmission in which gearshifts are accompanied by the traction force interruption and the method further comprising the step of disengaging the separator clutch (K) at an accelerated rate during a gearshift-related thrust traction force interruption.

* * * * *